US009934493B2

(12) United States Patent
Castinado et al.

(10) Patent No.: US 9,934,493 B2
(45) Date of Patent: Apr. 3, 2018

(54) REAL-TIME TRANSACTIONS FOR A VIRTUAL ACCOUNT

(71) Applicant: BANK OF AMERICA CORPORATION, Charlotte, NC (US)

(72) Inventors: Joseph B. Castinado, Northglenn, CO (US); Akshaya Negi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 531 days.

(21) Appl. No.: 14/176,649

(22) Filed: Feb. 10, 2014

(65) Prior Publication Data

US 2015/0199657 A1 Jul. 16, 2015

Related U.S. Application Data

(60) Provisional application No. 61/926,617, filed on Jan. 13, 2014.

(51) Int. Cl.
*G06Q 40/00* (2012.01)
*G06Q 20/02* (2012.01)
*G06Q 20/40* (2012.01)
*G06Q 20/10* (2012.01)

(52) U.S. Cl.
CPC ........... *G06Q 20/023* (2013.01); *G06Q 20/10* (2013.01); *G06Q 20/108* (2013.01); *G06Q 20/401* (2013.01)

(58) Field of Classification Search
CPC .............................. G06G 20/023; G06G 40/00
USPC .............................................. 705/41, 30, 38
See application file for complete search history.

(56) References Cited

U.S. PATENT DOCUMENTS

| 8,266,058 B1* | 9/2012 | Anderson | G06Q 20/351 705/30 |
| 2002/0152156 A1* | 10/2002 | Tyson-Quah | G06Q 20/10 705/38 |
| 2012/0011063 A1* | 1/2012 | Killian | G06Q 20/105 705/41 |
| 2012/0136781 A1 | 5/2012 | Fridman | |

FOREIGN PATENT DOCUMENTS

| WO | WO2002/037386 | 11/2001 |
| WO | WO2002/059847 | 1/2002 |
| WO | WO2006/094410 | 3/2006 |

* cited by examiner

*Primary Examiner* — Samica L Norman
(74) *Attorney, Agent, or Firm* — Michael A. Springs (57) ABSTRACT

According to some embodiments, a system comprises one or more processors associated with a financial institution. The financial institution provides a financial account for a user. The system also comprises a dedicated interface between the financial institution and an electronic payment service external to the financial institution. The electronic payment service provides a virtual account for the user. The one or more processors are configured to determine when the user requests a financial transaction to transfer funds from a source to a destination (one of which corresponds to the virtual account), validate the financial transaction based on data received from the electronic payment service over the dedicated interface, and transfer the funds to the destination. The funds are transferred prior to hard-posting such that the funds become available at the destination in real-time while the financial transaction is pending.

17 Claims, 4 Drawing Sheets

REAL-TIME TRANSACTIONS FOR A VIRTUAL ACCOUNT

RELATED APPLICATIONS

This application claims the benefit of priority of U.S. Provisional Patent Application No. 61/926,617 filed on Jan. 13, 2014.

TECHNICAL FIELD OF THE INVENTION

The present invention relates generally to financial transactions and more specifically to providing real-time transactions for a virtual account.

BACKGROUND OF THE INVENTION

Banks and other financial institutions process financial transactions using Automated Clearing House (ACH) procedures. ACH processes large volumes of credit and debit transactions in batches. For example, a first bank may generate batch files that contain thousands of instructions representing all of the transactions that its customers transacted with a second bank on that day. The first bank may periodically send the batch files to an ACH landing zone (such as an FTP site) at a predetermined time, such as once per day at 12:01 AM. The second bank may periodically pick up the batch files from the landing zone at a predetermined time, such as once per day at 3:01 AM. The second bank may process the transactions contained in the batch files and may hard-post the approved transactions. Once a particular transaction has been hard-posted, the transaction is complete (no longer pending) and the funds become available at the destination.

SUMMARY OF THE INVENTION

According to some embodiments, a system comprises one or more processors associated with a financial institution. The financial institution provides a financial account for a user. The system also comprises a dedicated interface between the financial institution and an electronic payment service external to the financial institution. The electronic payment service provides a virtual account for the user. The one or more processors are configured to determine when the user requests a financial transaction to transfer funds from a source to a destination (one of which corresponds to the virtual account), validate the financial transaction based on data received from the electronic payment service over the dedicated interface, and transfer the funds to the destination. The funds are transferred prior to hard-posting such that the funds become available at the destination in real-time while the financial transaction is pending.

Certain embodiments of the invention may provide one or more technical advantages. A technical advantage of one embodiment includes providing a dedicated interface between a financial institution and an external electronic payment service. The dedicated interface may allow the financial institution to efficiently validate financial transactions involving a virtual account that is under the control of the electronic payment service. Efficient validation may allow the financial institution to move funds in and out of the virtual account in real-time. In addition, the dedicated interface may allow the financial institution to continuously (or frequently) receive information from the electronic payment service. The information can include virtual account information, such as available accounts and account balances. Thus, the financial institution may be able to provide a user with visibility into accounts external to the financial institution. This visibility may help the user decide where to transfer funds. For example, the user may see that the account balance in the user's virtual account is high and may decide to transfer some of the money from the external virtual account to the user's financial account (e.g., an account controlled by/internal to the financial institution).

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
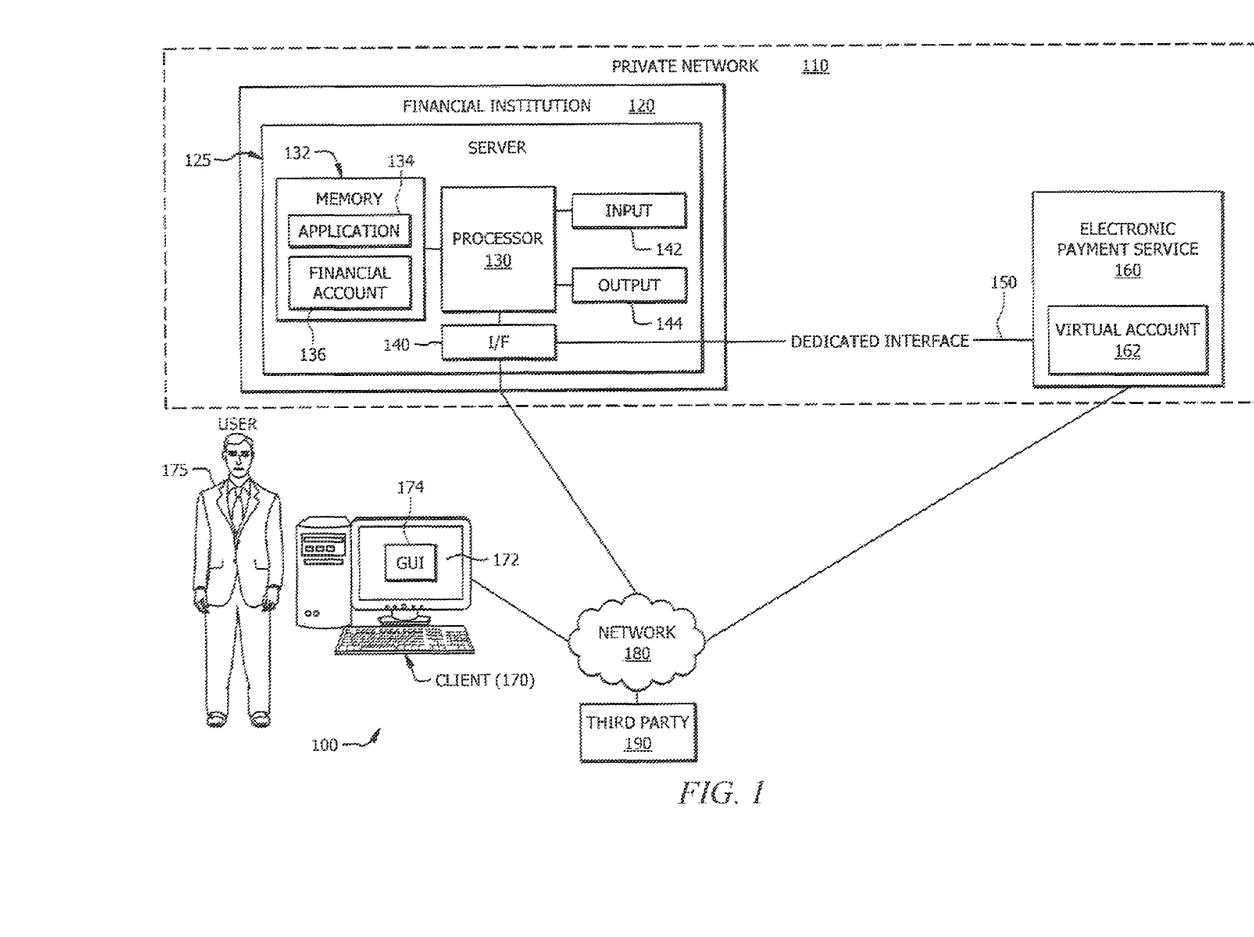
FIG. 1 illustrates an example of a system that provides real-time transactions for a virtual account.
Figure 2A:
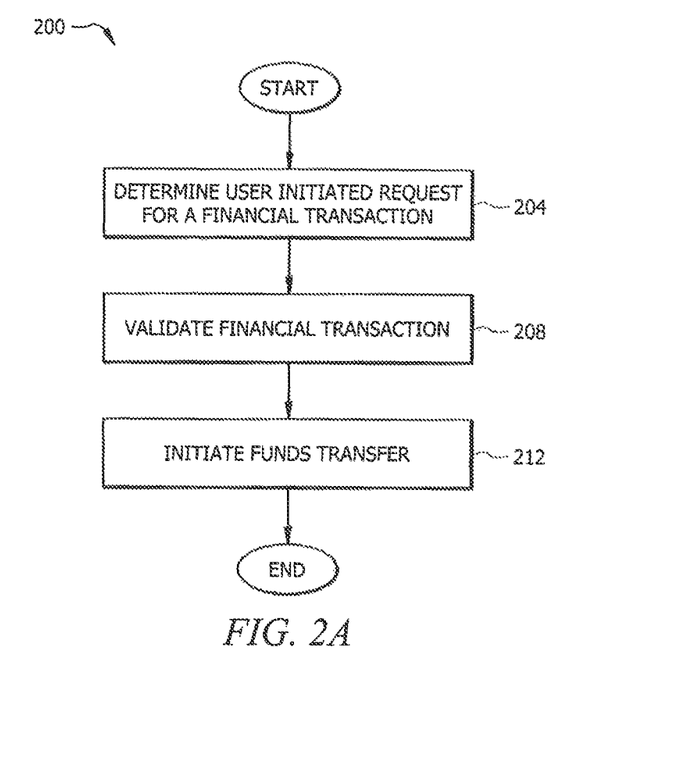
FIGS. 2A-2B illustrate an example of a method that provides real-time transactions for a virtual account.
Figure 2B:
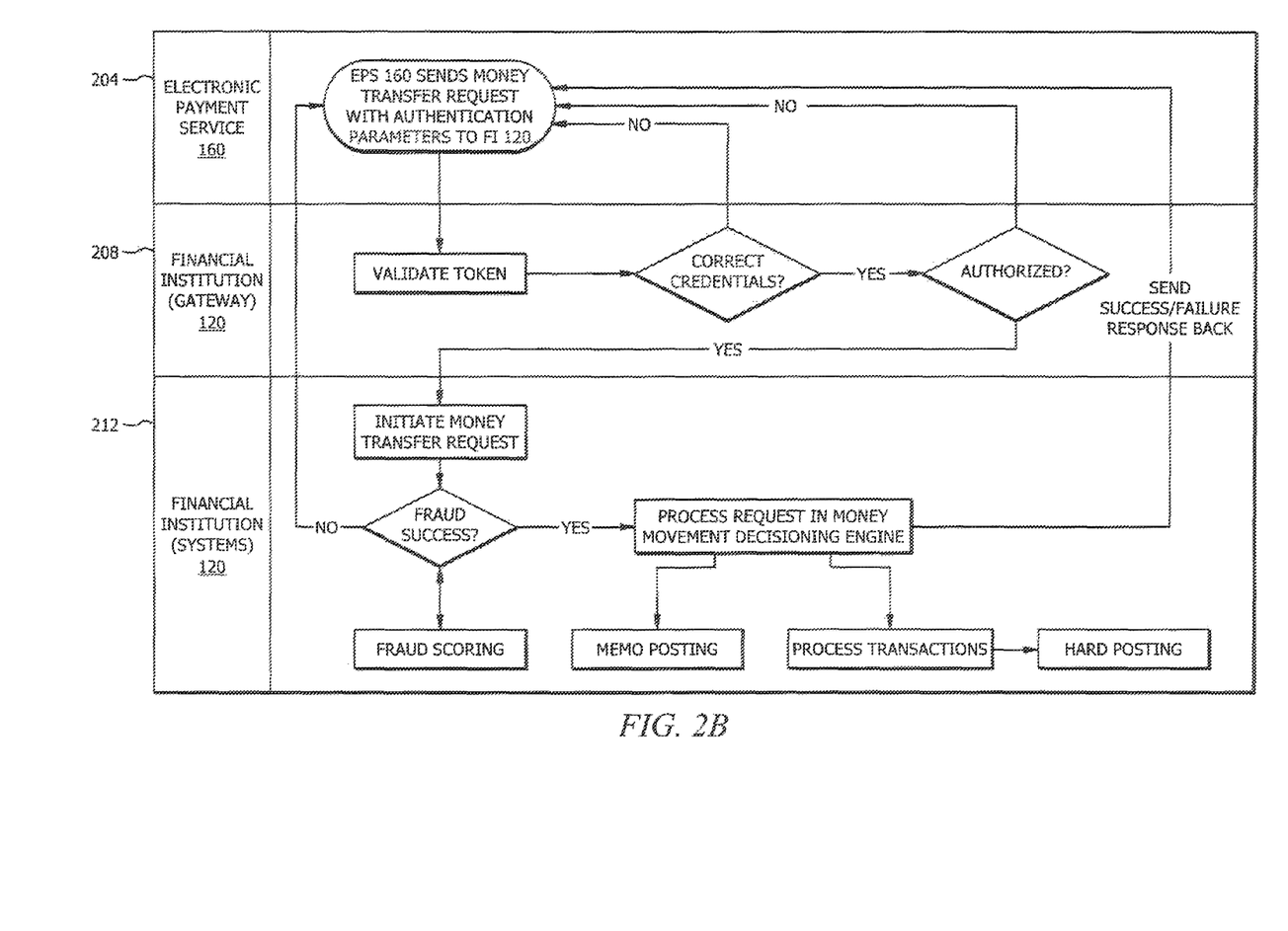
Figure 3:
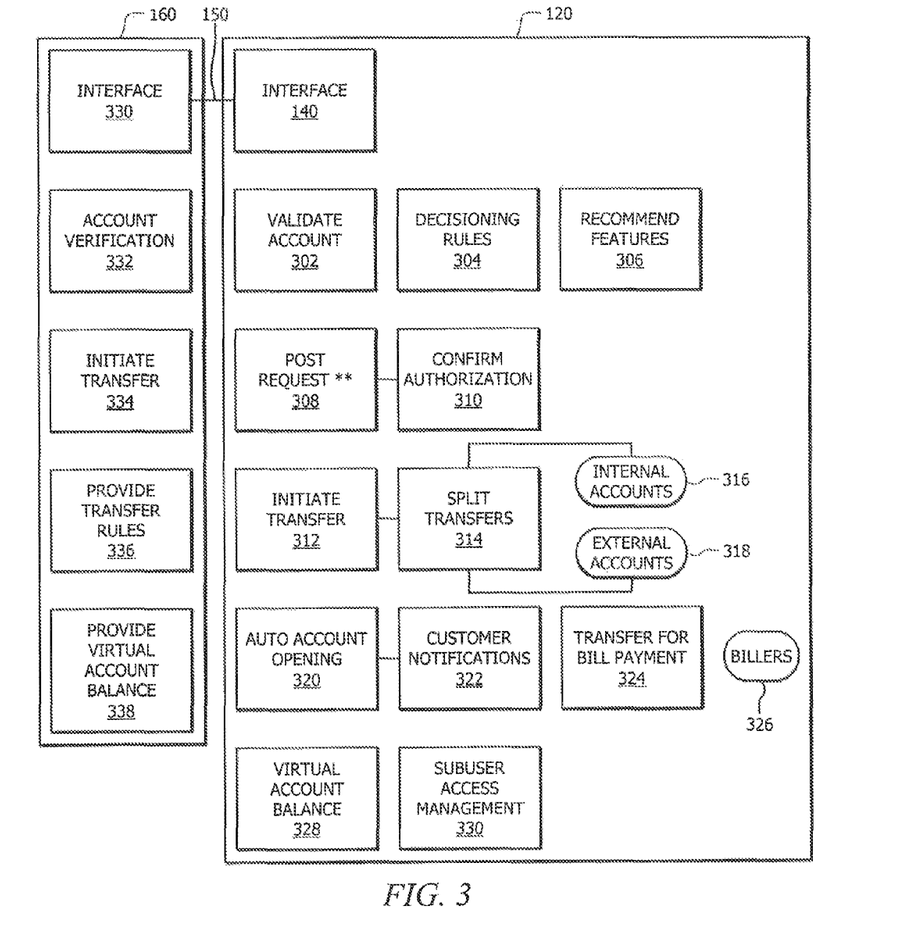
FIG. 3 illustrates an example of functional blocks that may be supported by the financial institution and the electronic payment service components of the system described in FIG. 1.

Embodiments of the present invention and its advantages are best understood by referring to FIGS. 1 through 3 of the drawings, like numerals being used for like and corresponding parts of the various drawings.

Banks and other financial institutions process financial transactions using Automated Clearing House (ACH) procedures. ACH processes large volumes of credit and debit transactions in batches. For example, a first bank may generate batch files that contain thousands of instructions representing all of the transactions that its customers transacted with a second bank on that day. The first bank may periodically send the batch files to an ACH landing zone (such as an FTP site) at a predetermined time, such as once per day at 12:01 AM. The second bank may periodically pick up the batch files from the landing zone at a predetermined time, such as once per day at 3:01 AM. The second bank may process the transactions contained in the batch files and may hard-post the approved transactions. Once a particular transaction has been hard-posted, the transaction is complete (no longer pending) and the funds become available at the destination. Unfortunately, ACH processing may introduce delays in transferring funds. Due to the file size, the batch files may take several hours to transmit to and from the landing zone, and may take even more time to process. ACH introduces additional delays waiting for the scheduled send and pick up times. Thus, it takes a least a day and often several days for funds to become available at the destination.

Delays in processing financial transactions may be inconvenient for bank customers. For example, the bank customer may also be a small business owner that sells handmade items, vintage items, or other products or services to individual consumers online. The consumers may pay the business owner over the Internet using an electronic payment service (which may be provided by an electronic payment service provider). The electronic payment service may credit the payment in a virtual account, such as an account that the electronic payment service provider associates with the business owner. The business owner may wish to transfer funds from the virtual account to his or her bank account in order to pay bills from the bank account. For example, the business owner may want to pay bills related to the business, such as utilities, rent, or supplies used to make the products. Transferring funds from a virtual account to a bank account may take several days to go through the ACH process. Embodiments of the present invention may allow for transferring the funds from the virtual account to the bank account in real-time so that the funds are immediately available to the bank customer. FIGS. 1 through 3 below illustrate a system and method for providing real-time transactions for a virtual account.

FIG. 1 illustrates a system 100 according to certain embodiments. System 100 may include a private network 110 comprising a financial institution 120 and an electronic payment service 160. Financial institution 120 may be communicatively coupled to electronic payment service 160 by a dedicated interface 150. Financial institution 120 and electronic payment service 160 may also be communicatively coupled to a network 180 comprising one or more clients 170 and (optionally) one or more third parties 190. Each client 170 may be associated with a user 175 that holds one or more financial accounts 136 with financial institution 120 and one or more virtual accounts 162 with electronic payment service 160. Financial institution 120 facilitates transferring funds to and from virtual account 162 in real-time. In some embodiments, funds may be transferred from user 175's financial account 136 to user 175's virtual account 162. In some embodiments, funds may be transferred from user 175's virtual account 162 to user 175's financial account 136 or to a third party 190 specified by user 175.

In general, user 175 initiates a request for a financial transaction to transfer funds from a source to a destination. User 175 may select virtual account 162 as either the source (to transfer funds out of virtual account 162) or the destination (to transfer funds into virtual account 162). Financial institution 120 determines that user 175 initiated the request and validates the financial transaction. To validate the transaction, financial institution 120 uses data received from electronic payment service 160 over dedicated interface 150. If the financial transaction passes validation, financial institution 120 transfers the funds from the source to the destination. The funds are transferred prior to hard-posting the financial transaction such that the funds become available at the destination in real-time while the financial transaction is pending.

In some embodiments, financial institution 120 may refer to a bank and financial account 136 may refer to a bank account (e.g., checking account, savings account, investment account, etc.). Electronic payment service 160 may refer to a service that transacts online payments and virtual account 162 may refer to user 175's account with electronic payment service 160. Financial institution 120 and electronic payment service 160 may be separate entities managed independently of one another. As an example, "Bank A" may be user 175's financial institution 120 and "Company B" may be user 175's electronic payment service 160.

Bank A may have certain systems and methods in place to decrease potential risks associated with conducting real-time transactions with external parties, such as Company B. For example, Bank A may communicate with Company B within private network 110 over dedicated interface 150. Dedicated interface 150 may be a physical or logical point-to-point connection between Bank A and Company B. Examples include a T-carrier (such as a T1 or T3) connection or a virtual private network (VPN) connection. Thus, private network 110 may refer to a private network or a virtual private network. Communication across dedicated interface 150 may be exchanged according to Simple Object Access Protocol (SOAP), Representational State Transfer (REST), or other suitable protocol. Data may be formatted according to Extensible Markup Language (XML), JavaScript Object Notation (JSON), or other suitable format.

Financial institution 120 may include one or more servers 125. In some embodiments, server 125 may refer to any suitable combination of hardware and/or software implemented in one or more modules to process data and provide the described functions and operations. In some embodiments, the functions and operations described herein may be performed by a pool of servers 125. In some embodiments, server 125 may include, for example, a mainframe, server, host computer, workstation, web server, data center, file server, a personal computer such as a laptop, or any other suitable device operable to process data. In some embodiments, server 125 may execute any suitable operating system such as IBM's zSeries/Operating System (7/OS), MS-DOS, PC-DOS, MAC-OS, WINDOWS, UNIX, OpenVMS, or any other appropriate operating systems, including future operating systems.

In general, server 125 facilitates transferring funds in and/or out of virtual account 162 in real-time. In some embodiments, servers 125 may include a processor 130, server memory 132, an interface 140, an input 142, and an output 144. Server memory 132 may refer to any suitable device capable of storing and facilitating retrieval of data and/or instructions. Examples of server memory 132 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates server memory 132 as internal to server 125, it should be understood that server memory 132 may be internal or external to server 125, depending on particular implementations. Also, server memory 132 may be separate from or integral to other memory devices to achieve any suitable arrangement of memory devices for use in system 100.

Server memory 132 is generally operable to store an application 134 and data associated with financial account 136. Application 134 generally refers to logic, rules, algorithms, code, tables, and/or other suitable instructions for performing the described functions and operations. In some embodiments, application 134 facilitates transferring funds in and/or out of virtual account 162 in real-time. FIGS. 2A-2B include examples of steps that may be performed by application 134 upon execution by processor 130.

Server memory 132 communicatively couples to processor 130. Processor 130 is generally operable to execute application 134 stored in server memory 132 to transfer funds according to the disclosure. Processor 130 may comprise any suitable combination of hardware and software implemented in one or more modules to execute instructions and manipulate data to perform the described functions for servers 125. In some embodiments, processor 130 may include, for example, one or more computers, one or more central processing units (CPUs), one or more microprocessors, one or more applications, and/or other logic.

In some embodiments, communication interface 140 (I/F) is communicatively coupled to processor 130 and may refer to any suitable device operable to receive input for server 125, send output from server 125, perform suitable processing of the input or output or both, communicate to other devices, or any combination of the preceding. Communication interface 140 may include appropriate hardware (e.g., modem, network interface card, etc.) and software, including protocol conversion and data processing capabilities, to communicate through network 180, dedicated interface 150, or other communication system that allows server 125 to communicate to other devices. Communication interface 140 may include any suitable software operable to transmit and receive data from various devices, such as electronic payment service 160, clients 170, and/or third parties 190. Communication interface 140 may include one or more ports, conversion software, or both. In general, communication interface 140 receives requests for financial transactions and communicates a suitable response. Examples of responses may include instructions to provide validation data to financial institution 120, notifications regarding the status of the financial transaction (e.g., success/fail or pending/complete), instructions to credit or debit account balances, and/or other suitable response depending on the transaction.

In some embodiments, input device 142 may refer to any suitable device operable to input, select, and/or manipulate various data and information. Input device 142 may include, for example, a keyboard, mouse, graphics tablet, joystick, light pen, microphone, scanner, or other suitable input device. Output device 144 may refer to any suitable device operable for displaying information to a user. Output device 144 may include, for example, a video display, a printer, a plotter, or other suitable output device.

Client 170 may refer to any device that enables user 175 to interact with server 125 and/or electronic payment service 160. In some embodiments, client 170 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. Client 170 may also comprise any suitable user interface such as a display 172, microphone, keyboard, or any other appropriate terminal equipment usable by a user 175. It will be understood that system 100 may comprise any number and combination of clients 170.

User 175 utilizes client 170 to interact with server 125 and/or electronic payment service 160 to initiate requests for real-time transfers of funds to and from virtual account 162. As an example, user 175 may use client 170 to login to electronic payment service 160's website and request to push funds from virtual account 162 to financial account 136. As another example, user 175 may use client 170 to login to financial institution 120's website and request to pull funds from virtual account 162 to financial account 136. User 175 may make requests on an ad hoc (transaction-by-transaction) basis and/or may set up rules that automatically request financial transactions in response to certain events.

In some embodiments, client 170 may include a graphical user interface (GUI) 174. GUI 174 is generally operable to tailor and filter data entered by and presented to user 175. GUI 174 may provide user 175 with an efficient and user-friendly presentation of fields for requesting financial transactions and/or viewing information, such as available accounts (e.g., accounts that may send/receive funds, including accounts internal and/or external to financial institution 120), account balances, the status of pending financial transactions, etc. GUI 174 may comprise a plurality of displays having interactive fields, pull-down lists, and buttons operated by user 175. GUI 174 may include multiple levels of abstraction including groupings and boundaries. It should be understood that the term GUI 174 may be used in the singular or in the plural to describe one or more GUIs 174 and each of the displays of a particular GUI 174.

In certain embodiments, network 180 may refer to any interconnecting system capable of transmitting audio, video, signals, data, messages, or any combination of the preceding. Network 180 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, a financial institution intranet, or any other suitable communication link, including combinations thereof.

In some embodiments, third party 190 may refer to a party other than financial institution 120, electronic payment service 160, and user 175. For example, third party 190 may refer to a biller that user 175 would like to pay, such as a utility company, a lessor, a supplier, or other biller. As another example, third party 190 may refer to an external brokerage company where user 175 holds an investment account. User 175 may initiate a request to transfer funds to third party 190 from virtual account 162 in real-time. Financial institution 120 may facilitate transferring the funds from virtual account 162 to third party 190. For example, financial institution may validate the financial transaction and transfer the funds to third party 190.

FIG. 2A illustrates an example of a method 200 that provides real-time transactions for a virtual account that a user holds with an electronic payment service. In some embodiments, the method may be performed by one or more processors associated with a financial institution, such as the user's bank or other financial institution where the user holds a financial account (e.g., savings account, checking account, investment account, etc.). The financial institution may communicate with the electronic payment service to facilitate the transaction, as described below.

At step 204, the financial institution determines that the user initiated a request for a financial transaction. The financial transaction requests to transfer funds from a source to a destination. The virtual account can be selected as either the source or the destination. For example, if the user would like to transfer funds out of the virtual account, the user may select the virtual account as the source. If the user would like to transfer funds into the virtual account, the user may select the virtual account as the destination. The transfer may take place between the virtual account and any other suitable account specified by the user. The specified account may be external or internal to the financial institution. As an example, the request may specify to transfer funds from the virtual account to an external third party biller that the user owes a payment (such as a utility provider, lessor, or supplier). Or, the user may specify to transfer funds from the virtual account to an internal financial account that the financial institution provides for the user (e.g., the user's savings account, checking account, investment account, etc.).

The financial institution may determine that the user initiated the request for the financial transaction in any suitable manner. As an example, the user may login to the electronic payment service's website and request to push funds from the virtual account to the financial account. The electronic payment service may then communicate the request to the financial institution over a dedicated interface. As another example, the user may login to the financial institution's website and request to pull funds from the virtual account to the financial account. The user may make requests on an ad hoc (transaction-by-transaction) basis and/or may set up rules for automatically generating requests for financial transactions in response to certain events. For example, the user may configure a rule that determines if the balance of the virtual account exceeds a pre-determined threshold and generates a request to transfer any funds in excess of the pre-determined threshold into the financial account. So, if the pre-determined threshold was set to $500 and the virtual account contained $800, the rule would generate a request to transfer $300 out of the virtual account (i.e., $800−$500=$300).

At step 208, the financial institution validates the financial transaction. In some embodiments, the financial institution communicates with the electronic payment service to validate the transaction. The electronic payment service may refer to an external/third party service managed independently of the financial institution. Thus, the financial institution may have certain systems and methods in place to decrease potential risks associated with conducting real-time transactions with an external party. For example, the financial institution may communicate with the electronic payment service over a dedicated interface. The dedicated interface may be a physical or logical point-to-point connection between the financial institution and the electronic payment service. Examples include a T-carrier (such as a T1 or T3) connection or a virtual private network (VPN) connection. Communication across the dedicated interface may be exchanged according to Simple Object Access Protocol (SOAP), Representational State Transfer (REST), or other suitable protocol. Data may be formatted according to Extensible Markup Language (XML), JavaScript Object Notation (JSON), or other suitable format.

The electronic payment service may communicate validation data to financial institution as part of a request to transfer funds or in response to a request to provide the validation data. Validation data may include a validate token, credentials, and any other suitable data to that the financial institution may need to confirm that the electronic payment service is a trusted system and/or to authorize the particular financial transaction. In some embodiments, the financial institution may verify that the validation data received from the electronic payment service matches validation data maintained by the financial institution before authorizing the financial transaction. If the validation fails, the financial institution notifies the electronic payment service and does not initiate the funds transfer. Once the validation passes, the financial institution performs step 212.

At step 212, the financial institution initiates the requested funds transfer. The step may include performing any independent checks to ensure the funds transfer is authorized. For example, the financial institution may check to ensure that the funds transfer does not violate any policies set up by the financial institution or by the user. Examples of policies may include fraud-detection policies that monitor financial transactions for unusual and potentially suspicious activity based on the frequency of transactions, location of transactions, dollar amount, etc. The policy check may also confirm that the financial accounts that the user holds with the financial institution are in good standing and that the virtual account is in good standing.

If the policy check is successful, the financial institution transfers the funds to the destination. The financial institution may create a memo-posting for the transaction in real-time and the funds may become available at the destination in real-time while the financial transaction is pending (e.g., prior to the hard-posting). So, if the user transferred $100 from the user's virtual account to the user's financial account, the user would be able to immediately access the $100 from the financial account through online banking, an ATM, a debit card, a banking center, etc. The financial institution may provide a notification to the electronic payment system indicating that the funds transfer was (or was not) successful.

After completing the memo-posting and making the funds available to the user at the destination, the financial institution may initiate a hard-posting to complete the financial transaction. For example, the financial institution may include the financial transaction in an ACH batch file to be processed at a pre-determined time. The ACH process may take several days and may allow for confirmation of the financial transaction according to safeguards put in place by ACH rules. The method then ends.

FIG. 2B illustrates an example of one embodiment of the method 200 in which user 175 initiates the financial transaction via electronic payment service 160. At step 204, electronic payment service 160 sends (and financial institution 120 receives) a money transfer request. The request includes authentication parameters, such as a token and/or credentials. At step 208, financial institution 120 validates the request. In some embodiments, a gateway associated with financial institution 120 may validate the request by checking the token/credentials. The gateway may comprise a processor 130 at (or near) the edge of financial institution 120's systems. If at step 204 the validation fails, the gateway may notify electronic payment service 160. Electronic payment service 160 may send authentication parameters again if it wants to retry the request. If at step 204 the validation passes, the gateway may route the request to other systems of financial institution 120, such as a processor 130 that handles funds transfers. At step 212, financial institution 120 initiates the money transfer. For example, financial institution 120 may confirm that the request passes fraud checks. If the request does not pass the fraud checks, financial institution 120 may notify electronic payment service 160 that the transaction failed the fraud check (and may optionally give electronic payment service 160 an opportunity to correct the failure and retry the request). If the request passes the fraud checks, financial institution 120 may process the request by generating a memo posting and processing the transaction to transfer the funds. After processing the transaction, financial institution may generate a hard posting for the transaction. The method then ends.

FIG. 3 illustrates an example of functional blocks that may be supported by financial institution 120 and electronic payment service 160.

In some embodiments, financial institution 120 may comprise one or more of the following functions: validate account 302, decisioning rules 304, recommend features 306, post request 308, confirm authorization 310, initiate transfer 312, split transfers 314, internal accounts 316, external accounts 318, auto account opening 320, customer notifications 322, transfer for bill payment 324, billers 326, virtual account balance 328, and sub-user access management 330.

Validate account 302 may confirm that the requested transaction is authorized (e.g., that electronic payment service 160 exchanges a valid token/credentials to financial institution 120). Financial institution 120 may perform validation to ensure the risk is low enough to take on the liability of an immediate financial exchange in which funds are transferred to/from external accounts before hard-posting (e.g., ACH) has been completed.

Decisioning rules 304 may apply rules such as limits on how much money can be transferred per transaction or per time period (such as daily). Decisioning rules 304 may help prevent fraud. In some embodiments, the requested transaction may be declined if it fails to satisfy the decisioning rules.

Recommend features 306 may monitor account information and recommend products or services to the user in response. For example, recommend features 306 may see that the user's account balance in a virtual account exceeds a threshold (e.g., $10,000). In response, recommend features 306 may offer the user a small business account with financial institution 120.

Post Request 308 may apply additional rules. The additional rules may require receipt of a confirmation in order to proceed with a requested transaction. As an example, the user (or financial institution 120) could configure a rule that requires confirmation for any transaction over $500. Applying this rule, if a requested transaction is in the amount of $1,000, confirmation may be sought from the user and the transaction may be stopped until confirm authorization 310 receives confirmation. Such rules may prevent fraud, such as transactions initiated by an unauthorized party trying to funnel money through the user's account.

Initiate transfer 312 may move funds from a source to a destination. Split transfers 314 may allow the user to select multiple destinations for the transfer. For example, the user may specify to move $1000 from the source (e.g., the virtual account) and split it into three deposits such as two internal accounts 316 (e.g., $500 in a first financial account, such as a checking account provided by financial institution 120 and $200 in a second financial account, such as a savings account provided by financial institution 120) and one external account 318 (e.g., an investment account that the user holds with a third party brokerage company). Thus, in some embodiments, a user logged into financial institution 120's website may be able to view not only available accounts/balances for internal accounts 316, but also available accounts/balances for external accounts 318 (including virtual account balance information that virtual account balance 328 obtains from electronic payment service 160). This may allow for efficient money management by linking internal and external user accounts to a common money management platform, such as an online banking website provided by financial institution 120 (e.g., users can view their virtual account balances, such as a balance in an account provided to the user by an electronic payment service provider, from the online banking website provided by a financial institution, such as a bank).

Transfer for bill payment 324 may facilitate moving funds from a virtual account to a biller 326. For example, the user can login to the online banking website and see a list of billers 326 and optionally bills associated with each biller. Examples of billers may include a utility company, a landscape service, a supplier, etc. The user may select to transfer money from the user's virtual account to a biller 326. In some embodiments, the user need only provide an email address or phone number for the biller and the financial institution 120 can apply money routing technology to determine how to route the money to a bank account associated with the biller. Although the preceding example describes a pull transaction (the user uses financial institution 120's website to initiate moving funds out of the virtual account in real-time), the system may also support push transactions (the user uses electronic payment service 160's website to initiate moving funds out of the virtual account in real-time).

As shown in FIG. 3, electronic payment service 160 may include account verification 332, initiate transfer 334, provide transfer rules 336, and provide virtual account balance 338 in some embodiments.

Embodiments of the present disclosure may provide one or more technical advantages. In some embodiments, a bank customer may be able to transfer funds to and from a virtual account in real-time. For example, the bank customer may sell products online. On day 1, the customer may make a sale and may receive a $100 payment in a virtual account (e.g., an account that the electronic payment service provider provides to the customer). The bank customer may need to purchase supplies right away to make the products. So, the bank customer can move the $100 from the virtual account to a bank account on day 1 and access the funds immediately (without having to wait several days for the hard-posting to complete).

In some embodiments, the electronic payment service and the financial institution may interact continually (rather than only communicating at a predetermined time, such as once per day at midnight). Not only may this allow for fast transfer times, it may also allow the financial institution and/or the electronic payment service to have up-to-date information about accounts associated with the user. For example, the user may login to the electronic payment service and see not only the virtual account provided by the electronic payment service, but also a list of valid accounts that the user may transfer funds to/from. Examples of such accounts include checking accounts, savings accounts, or investment accounts that the financial institution associates with the user and third party accounts, such as billers (e.g., materials suppliers, utility companies, lessors, or other billers to which the user may wish to make a payment) or third party financial institutions (e.g., a brokerage company where the user holds an investment account). Similarly, the user may login to the financial institution and see not only the financial account(s) provided by the financial institution, but also a list of other valid accounts that the user may transfer funds to/from (e.g., a virtual account associated with the electronic payment service or a third party account). In addition, in some embodiments, the user may be able to check account balances, transaction history, or other account information associated with both internal and external accounts belonging to the user.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described in detail, it should be understood that various changes, substitutions, and alterations can be made hereto without departing from the scope of the invention as defined by the appended claims.

What is claimed is:

1. A system, comprising:
one or more processors associated with a financial institution that provides a financial account for a user; and
a dedicated interface between the financial institution and an electronic payment service external to the financial institution, the electronic payment service provides a virtual account for the user, the dedicated interface comprising a physical or logical point-to-point interface that forms a private network between the financial institution and the electronic payment service;
the one or more processors configured to:
determine that the user initiated a request for a financial transaction, the financial transaction configured to transfer funds from a source to a destination, wherein the virtual account is selected as either the source or the destination;
validate the financial transaction based on data received from the electronic payment service over the dedicated interface;
confirm that the electronic payment service is trusted based on receiving the validation data over the dedicated interface; and
transfer the funds to the destination after confirming that the electronic payment service is trusted, the transfer of funds occurring prior to hard-posting the financial transaction such that the funds become available at the destination in real-time while the financial transaction is pending;
the one or more processors further configured to:
receive up-to-date information for the virtual account on a continual basis, the up-to-date information received by the financial institution from the electronic payment service via the dedicated interface, the up-to-date information comprising an account balance associated with the virtual account;
determine that the account balance received from the electronic payment service exceeds a threshold pre-configured by the user; and
pull funds that exceed the threshold from the virtual account to the financial account in real time.

2. The system of claim 1, wherein the virtual account is selected as the source and the financial account is selected as the destination.

3. The system of claim 1, wherein the virtual account is selected as the source and a third party account is selected as the destination.

4. The system of claim 1, wherein determining that the user initiated the request comprises:
determining a rule pre-configured by the user, the rule indicating to generate the request in response to an event;
determining that the event occurred; and
generating the request in response to determining that the event occurred.

5. The system of claim 1, the one or more processors associated with the financial institution further operable to:
communicate the account balance associated with the virtual account to a client device configured to display the account balance to the user.

6. The system of claim 1, wherein the one or more processors determine that the user used resources of the financial institution to initiate the request, the resources comprising a website of the financial institution that provides visibility into the virtual account and from which the user initiates the request to pull funds from the virtual account to the financial account.

7. A non-transitory computer readable storage medium comprising hardware, the non-transitory computer readable storage medium configured with logic, the logic, when executed by a processor, operable to:
monitor communication over a dedicated interface between a financial institution that provides a financial account for a user and an electronic payment service external to the financial institution, the electronic payment service provides a virtual account for the user, the dedicated interface comprising a physical or logical point-to-point interface that forms a private network between the financial institution and the electronic payment service;
determine that the user initiated a request for a financial transaction, the financial transaction configured to transfer funds from a source to a destination, wherein the virtual account is selected as either the source or the destination;
validate the financial transaction based on data received from the electronic payment service over the dedicated interface;
confirm that the electronic payment service is trusted based on receiving the validation data over the dedicated interface;
transfer the funds to the destination after confirming that the electronic payment service is trusted, the transfer of funds occurring prior to hard-posting the financial transaction such that the funds become available at the destination in real-time while the financial transaction is pending;
receive up-to-date information for the virtual account on a continual basis, the up-to-date information received by the financial institution from the electronic payment service via the dedicated interface, the up-to-date information comprising an account balance associated with the virtual account;
determine that the account balance received from the electronic payment service exceeds a threshold pre-configured by the user; and
pull funds that exceed the threshold from the virtual account to the financial account in real time.

8. The logic of claim 7, wherein the virtual account is selected as the source and the financial account is selected as the destination.

9. The logic of claim 7, wherein the virtual account is selected as the source and a third party account is selected as the destination.

10. The logic of claim 7, wherein determining that the user initiated the request comprises:
determining a rule pre-configured by the user, the rule indicating to generate the request in response to an event;
determining that the event occurred; and
generating the request in response to determining that the event occurred.

11. The logic of claim 7, the logic further operable to communicate an instruction to display the account balance.

12. The logic of claim 7, wherein the logic determines that the user used resources of the financial institution to initiate the request and, in response, asks the electronic payment service to send the data to validate the transaction in real-time over the dedicated interface.

13. A method, comprising:
performing, by one or more processors, the steps of:

monitoring communication over a dedicated interface between a financial institution that provides a financial account for a user and an electronic payment service external to the financial institution, the electronic payment service provides a virtual account for the user, the dedicated interface comprising a physical or logical point-to-point interface that forms a private network between the financial institution and the electronic payment service;

determining that the user initiated a request for a financial transaction, the financial transaction configured to transfer funds from a source to a destination, wherein the virtual account is selected as either the source or the destination;

validating the financial transaction based on data received from the electronic payment service over the dedicated interface;

confirming that the electronic payment service is trusted based on receiving the validation data over the dedicated interface;

transferring the funds to the destination after confirming that the electronic payment service is trusted, the transferring of funds occurring prior to hard-posting the financial transaction such that the funds become available at the destination in real-time while the financial transaction is pending;

receiving up-to-date information for the virtual account on a continual basis, the up-to-date information received by the financial institution from the electronic payment service via the dedicated interface, the up-to-date information comprising an account balance associated with the virtual account;

determining that the account balance received from the electronic payment service exceeds a threshold pre-configured by the user; and pulling funds that exceed the threshold from the virtual account to the financial account in real time.

14. The method of claim 13, wherein the virtual account is selected as the source and the financial account is selected as the destination.

15. The method of claim 13, wherein the virtual account is selected as the source and a third party account is selected as the destination.

16. The method of claim 13, wherein determining that the user initiated the request comprises:

determining a rule pre-configured by the user, the rule indicating to generate the request in response to an event;

determining that the event occurred; and generating the request in response to determining that the event occurred.

17. The method of claim 13, further comprising communicating an instruction to display the account balance.

\* \* \* \* \*